July 26, 1966            L. L. GENUIT            3,263,122
CURRENT LIMITING INVERTER CIRCUITS AND APPARATUS FOR
OPERATING ELECTRIC DISCHARGE LAMPS AND OTHER LOADS
Filed May 1, 1963            2 Sheets-Sheet 1
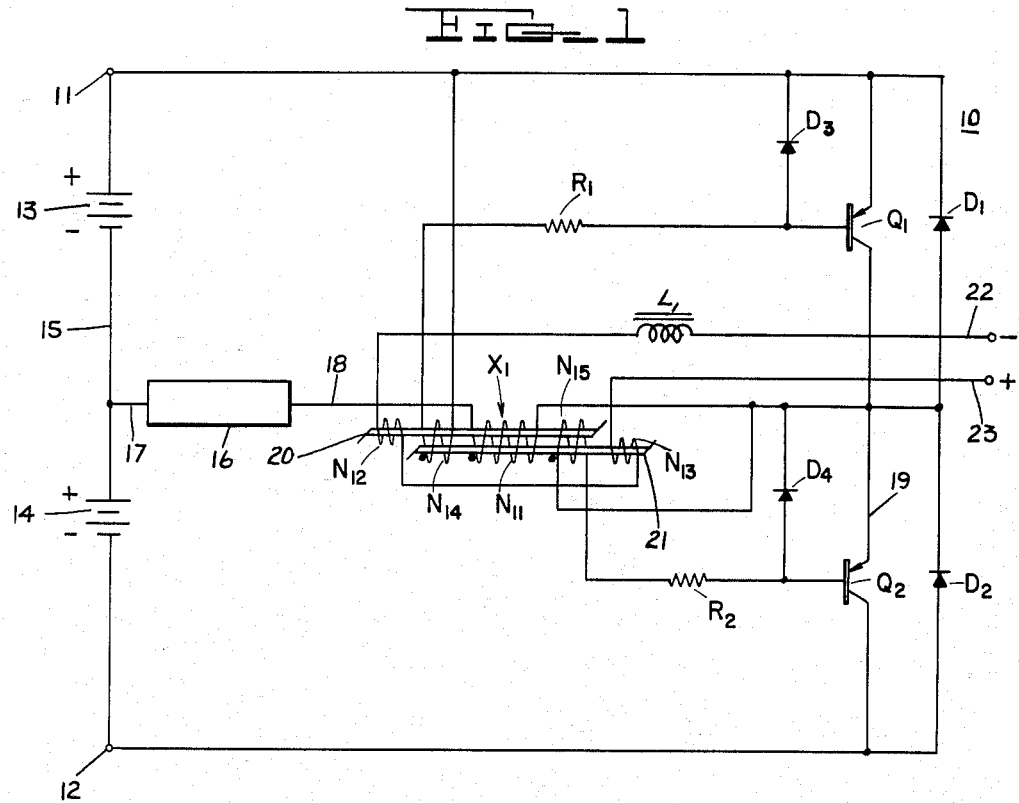
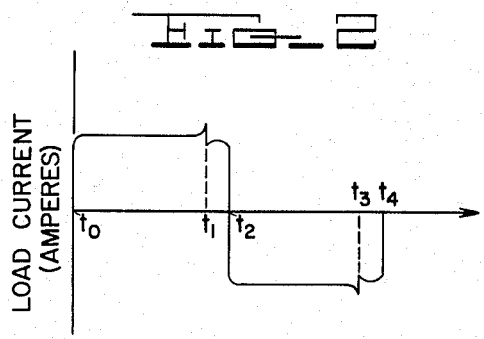
INVENTOR.
Luther L. Genuit,
BY Henry J. Marinich
Attorney.

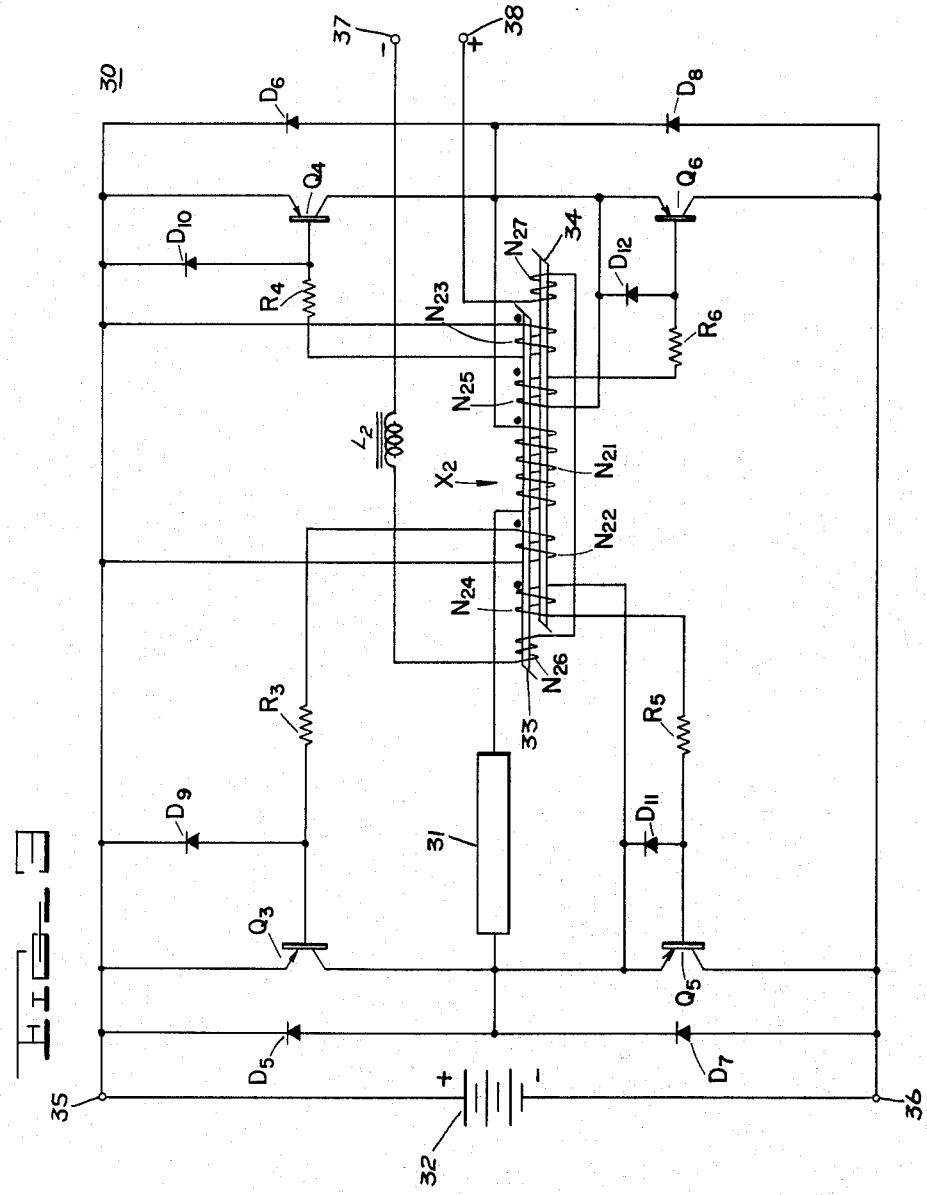

United States Patent Office

3,263,122
Patented July 26, 1966

3,263,122
CURRENT LIMITING INVERTER CIRCUITS AND APPARATUS FOR OPERATING ELECTRIC DISCHARGE LAMPS AND OTHER LOADS
Luther L. Genuit, Danville, Ill., assignor to General Electric Company, a corporation of New York
Filed May 1, 1963, Ser. No. 277,354
11 Claims. (Cl. 315—209)

This invention relates to inverter circuits and apparatus for converting direct current to an alternating current. More particularly, it relates to an improved inverter circuit which is inherently current limiting and which is particularly suitable for the operation of one or more electric discharge lamps.

In some applications it is desirable, if not necessary, to operate a load with an alternating current that is effectively limited. For example, where it is desired to operate loads having essentially negative impedance characteristics such as fluorescent lamp loads, it is essential that the current supplied to the lamps be limited to prevent destruction of the lamps.

Where fluorescent lamps are to be operated from a D.C. power source, inverter circuits can be utilized to provide alternating output for the operation of the lamps at frequencies above a thousand cycles per second and thereby achieve improvements in circuit and lamp efficiency and a reduction in the volt-ampere rating of the reactive devices employed, as compared with conventional ballasts using high leakage reactance type of transformers. Also, conventional fluorescent lamps are preferably operated with an alternating potential to prevent mercury migration to one end of the lamp. It will be appreciated that where conventional fluorescent lamps are operated with a D.C. potential the mercury vapor in the lamp tends to migrate to one end of the lamp and causes a darkening at the end of the lamp unless the current to the lamp is periodically reversed.

When conventional inverter circuits are used to supply an alternating potential for operating loads having a negative impedance characteristic, an additional means must be provided for effectively limiting the load current. A ballasting reactive device is generally used to perform the function of regulating the current supplied to the load. It is therefore desirable that the need for ballasting devices be eliminated. Also, conventional high frequency inverter circuits employ separate inverter tuned circuits or filter networks. Since these filter networks add to the complexity of the inverter circuit, it is desirable that the need for such networks be eliminated. Further, where the inverter employs a semiconductor type of switching device, it is particularly desirable that the voltage across the switching device relative to the load voltage be kept at a minimum.

Accordingly, it is a general object of the invention to provide an improved inverter circuit for use in conjunction with loads, such as fluorescent lamps, having a negative impedance characteristic.

It is another object of the invention to provide an improved inverter circuit and apparatus which is inherently current limiting.

Another object of the invention is to provide an improved inverter and apparatus that can be economically manufactured.

It is still another object of the invention to provide an improved inverter and apparatus employing semiconductor switching devices wherein it is possible to achieve reductions in the semiconductor switch operating voltages relative to the voltage across the load.

In carrying out one form of my invention, I have provided an improved current limiting inverter circuit in which a first unilateral semiconductor switching device operable between a low impedance and a high impedance condition is connected in circuit with a first D.C. potential source so that when it is switched to a low impedance condition, a path is provided for the flow of current from the first D.C. potential source to a saturating reactor and a load in one direction. Further, a second unilateral semiconductor switching device operable between a low impedance and a high impedance condition is connected in circuit with a second D.C. potential source and the saturable reactor so that when it is switched to the low impedance condition a path is provided for the flow of current from the second source to the saturating reactor and the load in a reverse direction. A unidirectional conducting device is connected across each of the semiconductor switching devices to provide a path for the flow of reverse current thereacross.

According to the invention the switching action of the semiconductor devices during operation is controlled by the saturating reactor, and the load current is also maintained at a predetermined level in each half cycle by the saturating reactor. The saturating reactor is comprised of a first and a second saturable core, and the main winding of the saturating reactor is wound over both of the saturable cores. A first bias means is associated with the first saturable core to provide a bias magnetomotive force that opposes the magnetizing magnetomotive force of the main winding when current flows through the main winding in one direction and thereby renders the first saturable core active in one half cycle. A second bias means is associated with the second saturable core to provide a bias magnetomotive force that opposes the magnetizing magnetomotive force of the main winding when the current through the main winding flows in the opposite direction to render the second saturable core active in the other half cycle.

The semiconductor switching devices are preferably transistors or gate-turn-off controlled rectifiers, although other types of semiconductor devices can be employed in the practice of the invention. The first semiconductor switching device is coupled with a first auxiliary winding wound over both the first and second saturable cores to drive the switching device to the low impedance condition at the beginning of the recovery period of the second saturable core and to the high impedance condition in response to the saturated condition of the first saturable core to provide one half cycle of operation. The second switching device is coupled with a second auxiliary winding which is wound over both saturable cores and is driven to its low impedance condition at the beginning of the recovery period of the first saturable core and to its high impedance condition in response to the saturated condition of the second saturable core.

In another aspect of the invention I have provided an improved inverter circuit and apparatus in which four semiconductor switching devices are connected in a bridge arrangement across a D.C. potential source. A fluorescent lamp and a saturating reactor are connected in series circuit relationship within the bridge arrangement. A current flow in one direction is provided through the lamp and saturating reactor when one pair of the semiconductor switching devices are in their low impedance condition, and a current flow in a reverse direction is provided when the other pair of semiconductor switching devices are driven to their low impedance condition. The switching action of the semiconductor switching devices is controlled by four auxiliary windings inductively coupled with a main winding of the saturating reactor.

The saturating reactor is comprised of a pair of superposed saturable cores on which the main winding and the auxiliary windings are wound. A first bias winding is wound only over the first saturable core to provide a bias magnetomotive force that opposes the magnetizing magneto motive force of the main winding so as to render the first saturable core active during one half cycle. A second bias winding is wound only over the second saturable core and provides a bias magnetomotive force that opposes the magnetizing magnetomotive force so that the second saturable core is active in the other half cycle. A diode element is coupled across each of the semiconductor switches to provide a path for current flow during a portion in each half cycle when one of the active saturable cores is recovering.

By employing four semiconductor switching devices it was found that the switching device operating voltage relative to the lamp voltage could be reduced by one half as compared with the voltage requirements of the semiconductor switching devices in an inverter circuit employing two semiconductor switching devices. The inverter circuit is inherently current limiting since the unsaturated inductance of one of the saturable cores limits the current during the portion of each half cycle when the lamp is energized from the D.C. potential source. During the portion of each half cycle when the power is interrupted from the source, the lamp current is limited since it is sustained by the saturating reactor at a current level which produces cancellation of the bias magnetomotive force in the active core of the saturating reactor.

The subject matter which I regard as my invention is set forth in the appended claims. The invention itself, however, together with further objects and advantages thereof may be better understood by referring to the following description taken in connection with the accompanying drawings in which:

FIGURE 1 is a schematic circuit diagram of an improved current limiting inverter circuit embodying one form of my invention;

FIGURE 2 is an illustration of the load current waveforms as observed on a cathode ray oscilloscope; and FIGURE 3 is a schematic circuit diagram of the improved current limiting inverter circuit illustrating another embodiment of the invention.

In FIGURE 1, I have illustrated a current limiting inverter 10 embodying one form of my invention in which the semiconductor devices $Q_1$ and $Q_2$ are transistors of the PNP type. As shown, input terminals or leads 11, 12 of the current limiting inverter 10 are connected in circuit with two D.C. potential sources 13, 14. It will be seen that the D.C. potential sources 13, 14 are connected in series circuit relation by a connection 15. A load 16, which may be a fluorescent lamp or other type of electric discharge device, is connected by lead 17 in circuit with the connection 15 joining the two potential sources 13, 14 and is connected by means of an output lead 18 in circuit with one end of a main winding $N_{11}$ of a saturating reactor $X_1$. The other end of the main winding $N_{11}$ is connected to a connection 19 joining the transistors $Q_1$, $Q_2$ in series circuit relation. Thus, two loops are formed with a common electrical path which includes the saturating reactor $X_1$ and the load 16.

When transistor $Q_1$ is driven to its low impedance condition, current flows in the loop which includes the potential source 13, terminal 11, transistor $Q_1$, the saturating reactor $X_1$ and the load 16. When transistor $Q_2$ is in the low impedance condition and transistor $Q_1$ is in its high impedance condition, the other loop which includes power source 14 and transistor $Q_2$ comes into play, the current flow through the lamp 16 and the saturating reactor $X_1$ now being in a reverse direction.

The saturating reactor $X_1$ includes a pair of saturable cores 20, 21 preferably made of magnetic material having a substantially rectangular hysteresis loop. Wound on both saturable cores 20, 21 are the main winding $N_{11}$ and auxiliary windings $N_{14}$ and $N_{15}$. The auxiliary windings $N_{14}$, $N_{15}$ are coupled across the emitter-base junctions of the transistors $Q_1$ and $Q_2$, respectively. It will be seen that a bias winding $N_{12}$ is wound only over saturable core 20 while the other bias winding $N_{13}$ is wound only over the other saturable core 21. Bias windings $N_{12}$, $N_{13}$ are connected to leads or terminals 22, 23 provided for connection to source of D.C. bias current. The source of D.C. bias current must include a high A.C. impedance such as provided by a choke $L_1$ in order that it will suppress harmonic currents in the bias windings $N_{12}$, $N_{13}$.

In the exemplification of the invention which was actually reduced to practice, as will hereinafter be more fully described, the two saturable cores 20, 21 were toroidal in shape. The bias winding $N_{12}$ was first wound on the saturable core 20, and winding $N_{13}$ was wound on saturable core 21. The toroidal cores 20, 21 were then stacked one on top of the other, and the main windings $N_{11}$ and auxiliary windings $N_{14}$ and $N_{15}$ were then wound over both of the saturable cores 20, 21. Bias windings $N_{12}$ and $N_{13}$ were wound in series opposing relationship so that when the windings $N_{12}$, $N_{13}$ were energized with a D.C. current, the winding $N_{12}$ would produce saturation in one direction in saturable core 20 and the winding $N_{13}$ would produce saturation in opposite direction in the other saturable core 21.

Diodes $D_1$ and $D_2$ are connected in shunt with the transistors $Q_1$ and $Q_2$, respectively, and provide a path for reverse current flow across transistors $Q_1$, $Q_2$ during the recovery period of the saturating reactor $X_1$. The diodes $D_3$, $D_4$ connected across the emitter-base junctions of the transistors $Q_1$ and $Q_2$ prevent the junctions from being damaged due to an excessive reverse bias being applied across the junctions. The resistors $R_1$ and $R_2$ are connected with the base electrodes of the transistors $Q_1$ and $Q_2$ to limit the base drive current.

Referring now to both the schematic circuit diagram shown in FIGURE 1 and the load current waveform shown in FIGURE 2, the operation of the current limiting inverter 10 will be more fully described. At the start of an arbitrary positive half cycle of the alternating output of the current limiting inverter, transistor $Q_1$ is driven to its low impedance condition by the base drive current supplied by auxiliary winding $N_{14}$, and current from the D.C. potential source 13 now flows through the transistor $Q_1$ through the main winding $N_{11}$ and the lamp 16. This current rises very rapidly until the magnetizing magnetomotive force of the main winding $N_{11}$ cancels the bias magnetomotive force in the active saturable core 20. It will be understood that during the positive half cycle the magnetomotive force of the main winding $N_{11}$ is in the same direction as the bias magnetomotive force of the winding $N_{13}$ on saturable core 21. Thus, saturable core 21 is driven further into saturation and is inactive during the positive half cycle. As will be seen from the load current waveform, during the greater portion of the cycle the current is substantially constant. This is due to the fact that any further increase in the load current is opposed by the high unsaturated inductance of the active saturable core 20.

At the time $t_1$ shown in FIGURE 2, the active saturable core 20 begins to enter saturation in an opposing direction to the D.C. saturated condition. At this point the voltage across the main winding $N_{11}$ of the saturating reactor $X_1$ falls off sharply and causes the base drive supplied to transistor $Q_1$ by the auxiliary winding $N_{14}$ to fall off. As a result transistor $Q_1$ reverts to its high impedance or nonconducting condition to interrupt the supply of current from the source 13. This is accomplished by a reversal in the polarity of the voltage across the main winding $N_{11}$. The voltage across auxiliary winding $N_{15}$ also reverses at this time, providing a forward bias current to transistor $Q_2$ and thereby switching $Q_2$ to its low impedance condition.

The saturating reactor $X_1$ now sustains the supply of current to the lamp 16 during the remainder of the positive half cycle or the period $t_1 - t_2$ indicated in the load current waveform of FIGURE 2. During this interval the energy that was stored in the active saturable core 20 during the initial period $t_0-t_1$ is supplied in part to the load and in part is returned to the D.C. potential source 14. During the interval $t_1-t_2$ or the recovery period of the saturable core 20, the load current flows in a loop which includes the main winding $N_{11}$ of the saturating reactor $X_1$, the load 16, the D.C. potential source 14 and diode $D_2$.

At the end of the recovery period of saturable core 20 or at time $t_2$, as shown in FIGURE 2, the voltage across the main winding $N_{11}$ falls off abruptly, but does not collapse to zero because of a sharp reversal of current in winding $N_{11}$ of reactor $X_1$. The load current now flows in a reverse direction and in a loop which includes D.C. potential source 14, lead 17, load 16, output lead 18, the main winding $N_{11}$, transistor $Q_2$, and terminal 12. The reversal of current flow through the main winding $N_{11}$ now causes saturable core 21 to be driven out of saturation.

The negative half cycle begins at time $t_2$ when the current increases sharply in the negative direction. Saturable core 21 is now the active core, while saturable core 20 remains inactive since it is driven further into saturation. During the unsaturated condition of the core 21 the polarity of the voltage induced across the auxiliary winding $N_{15}$ is such that its right end is negative with respect to the other end, and base drive is maintained across the emitter-base junction of the transistor $Q_2$. As in the preceding half cycle, it will be noted from the load current waveform of FIGURE 2 that the magnitude of the load current is substantially constant during the greater portion of the cycle, the current being maintained at the level at which the ampere-turns of the main winding $N_{11}$ are substantially equal to the ampere-turns of the bias winding $N_{13}$. Any further increase in the current above this level is opposed by the high unsaturated impedance of the saturable core 21. At time $t_3$ the active saturable core 21 begins to enter saturation, and the voltage across the main winding $N_{11}$ drops sharply. Consequently, the voltage across the auxiliary winding $N_{15}$ and the emitter-base junction also falls off to cause transistor $Q_2$ to switch to a high impedance condition.

During the interval $t_3-t_4$ the saturating reactor $X_1$ sustains the supply of current to the lamp 16 and also returns a portion of the energy stored during the interval $t_2-t_3$ to the D.C. source 13. During this period, the load current flows in a path which includes the main winding $N_{11}$, diode $D_1$, terminal 11, the D.C. source 13, lead 17 and the lamp 16. Immediately following the recovery period of the saturable core 21, load current reverses, flowing now through transistor $Q_1$ to start another cycle of operation.

By way of further exemplification of the invention the current limiting inverter 10 shown in FIGURE 1 was constructed and reduced to practice. The following specifications of this specific exemplification of the invention are given by way of illustration as follows:

Saturation reactor $X_1$:
    Saturable cores 20, 21 _____ Arnold toroidal cores 2T4635D2.
    Bias windings $N_{12}$, $N_{13}$ _____ 50 turns of .032 inch in diameter wire.
    Auxiliary windings $N_{14}$, $N_{15}$ - 15 turns of .0142 inch in diameter wire.
    Main winding $N_{11}$ _____ 150 turns of .0142 inch in diameter wire,
D.C. bias supply _____ 0.57 ampere.
Potential sources 13, 14 _____ 40 volts D.C.
Resistors $R_1$, $R_2$ _____ 470 ohms.
Transistors $Q_1$, $Q_2$ _____ 2N1046.
Diodes $D_1$, $D_2$ _____ 4JA10D.
Diodes $D_3$, $D_4$ _____ IN98.

The operation of the current limiting inverter employing the foregoing components was initiated by momentarily connecting the base of the transistor $Q_1$ with the negative terminal of the voltage source 13 through a 15,000 ohms resistor. Although a resistive load of 125 ohms was operated by the inverter, it will be understood that the inverter can be readily adapted for operating an electric discharge lamp or other load having a negative impedance characteristic.

An important advantage of the invention is that the voltage burden of the semiconductor switching devices $Q_1$, $Q_2$ relative to the load voltage is reduced. As compared with conventional inverter circuits proposed for use in conjunction with negative impedance type of loads such as fluorescent lamps, the improved inverter circuit possesses the advantage that it is inherently current limiting and does not require a ballasting reactor to regulate the load current. Also, an advantage of the improved current limiting inverter circuit is that it employs a relatively simple circuit configuration.

In FIGURE 3 I have illustrated a schematic circuit diagram of an improved inverter 30 embodying one form of my invention in which a further reduction of the voltage burden on the semiconductive switching devices relative to the load voltage can be achieved by the addition of two additional switching devices. In this improved version of the current limiting inverter four transistors $Q_3$, $Q_4$, $Q_5$ and $Q_6$ are connected in a bridge arrangement. A fluorescent lamp 31 and a saturating reactor $X_2$ are connected within the bridge arrangement.

Transistor $Q_3$ and transistor $Q_6$ when driven to a low impedance condition provide a path for current flow in one direction through the fluorescent lamp 31 and the main winding $N_{21}$ of the saturating reactor $X_2$. Transistors $Q_4$ and $Q_5$ provide a path for current flow in a reverse direction to thereby supply an alternating output to the fluorescent lamp 31. Diodes $D_5$, $D_6$, $D_7$ and $D_8$ are connected in shunt with the transistors $Q_3$, $Q_4$, $Q_5$ and $Q_6$ to provide a path for the flow of current to the lamp 31 and to the source 32 during the portion of each half cycle when the saturating reactor $X_2$ is sustaining the flow of current to the lamp 31. The diodes $D_9$, $D_{10}$, $D_{11}$ and $D_{12}$ connected across the emitter-base junctions of the transistors $Q_3$, $Q_4$, $Q_5$ and $Q_6$ are provided to protect the emitter-base junctions from being damaged when an excessive reverse bias is applied across the junctions. The resistors $R_3$, $R_4$, $R_5$ and $R_6$ are connected in circuit with the base electrodes to limit the base drive current of transistors $Q_3$, $Q_4$, $Q_5$ and $Q_6$, respectively.

The saturating reactor $X_2$ has a saturable core arrangement similar to the saturating reactor $X_1$ of FIGURE 1. It is comprised of two saturable cores 33, 34 superposed on each other. The main winding $N_{21}$ and the auxiliary windings $N_{22}$, $N_{23}$, $N_{24}$ and $N_{25}$ are wound over both of the saturable cores 33, 34. The D.C. bias winding $N_{26}$ is wound only on the saturable core 33 while D.C. bias winding $N_{27}$ is wound only on saturable core 34. The D.C. bias windings $N_{26}$, $N_{27}$ are connected through a choke $L_2$ to the terminals 37, 38. The choke $L_2$ is provided to suppress harmonic currents in the bias windings $N_{26}$, $N_{27}$.

When the current through the main winding $N_{21}$ flows in one direction, the voltage induced across auxiliary windings $N_{23}$ and $N_{24}$ is such that transistors $Q_4$ and $Q_5$ are driven to their low impedance condition. Also, magnetic core 33 is now being driven out of saturation while the other magnetic core 34 is being driven further into saturation. When the current flow through the main winding $N_{21}$ reverses in the next half cycle, the voltage induced in auxiliary windings $N_{22}$ and $N_{25}$ is of such polarity that the transistors $Q_3$ and $Q_6$ are driven to the low impedance condition and saturable core 34 is now rendered active.

The operation of the current limiting circuit 30 is initiated by connecting input terminals or leads 35, 36 to the D.C. voltage source 32 and connecting the bias terminals or leads 37, 38 to a bias current supply. Where the load is a rapid start type of fluorescent lamp, a small 60 cycle filament transformer is connected to the lamp filaments to provide the filament heating current. Also, a starting aid voltage may be applied to the lamp to aid in initiating the electric discharge. It was found that the voltage induced in the saturating reactor $X_2$ during the rise of the D.C. bias current, as it was switched on, was sufficient to initiate the operation of the transistors.

Taking an arbitrary half cycle of operation when the flow of current to the lamp 31 is from right to left as viewed in the schematic circuit diagram of FIGURE 3, transistors $Q_4$ and $Q_5$ are in their low impedance condition. The current flow from the power source 32 is through input terminal 35, transistor $Q_4$, main winding $N_{21}$, the lamp 31, transistor $Q_5$ and input terminal 36. When the active saturable core 33 begins to enter saturation in the direction opposite to D.C. saturated condition, the voltage across the main winding $N_{21}$ of saturating reactor $X_2$ falls off abruptly thereby causing the base drive supplied to transistors $Q_4$ and $Q_5$ to fall off. As a result, transistors $Q_4$, $Q_5$ turn off, and the voltage across the main winding $N_{21}$ reverses rapidly to sustain the current flow to the lamp 31. A coincident reversal of polarity of auxiliary windings $N_{22}$ and $N_{25}$ causes forward bias currents to be supplied to transistors $Q_3$ and $Q_6$.

For the remainder of the half cycle diodes $D_5$ and $D_8$ are forwardly biased, and the path of current flow is from the main winding $N_{21}$ to the lamp 31, diode $D_5$, input terminal 35, the D.C. source 32, input terminal 36, and diode $D_8$. During this portion of the half cycle the energy that was stored in the active saturable core 33 during the early portion of the cycle when transistors $Q_4$, $Q_5$ where in the low impedance condition, is now discharged to lamp 31 and returned to the D.C. source 32. At the end of the recovery period of the saturable core 33, the voltage across the main winding $N_{21}$ falls off abruptly. As the main winding voltage begins to collapse, lamp current falls rapidly to zero and builds up rapidly in the opposite direction flowing through transistors $Q_3$ and $Q_6$. Saturable core 34 is now driven to its active region. In this manner the second half cycle of operation is initiated.

With transistors $Q_3$ and $Q_6$ in a low impedance condition, the path of current flow from the D.C. source 32 is through terminal 35, transistor $Q_3$, lamp 31, main winding $N_{21}$, transistor $Q_6$ and input terminal 36. During this portion of the half cycle when transistors $Q_3$ and $Q_6$ conduct, the lamp current is maintained at a substantially constant level by the unsaturated inductance of the saturable core 34. When the saturable core 34 begins to enter saturation in a direction opposite to the D.C. saturated condition of the core, the voltage across the main winding $N_{21}$ drops abruptly and causes the base drive current flowing in the auxiliary windings $N_{22}$ and $N_{25}$ to fall off and turn off the transistors $Q_3$ and $Q_6$. Thus, the supply of power from the D.C. source 32 is interrupted, and the polarity of the voltage across the main winding $N_{21}$ reverses. During the recovery period of saturable core 34 in this half cycle, the path of current flow is from the main winding $N_{21}$, diode $D_6$, input terminal 35, the D.C. source 32, input terminal 36, diode $D_7$ and the lamp 31. At the end of the recovery period of the saturating reactor $X_2$, the voltage across the main winding $N_{21}$ again falls off abruptly, load current reverses, flowing through transistors $Q_4$ and $Q_5$ to initiate another cycle of operation.

By way of another specific exemplification of the invention, the current limiting inverter 30 shown in FIGURE 3 was constructed and adapted for operating a 15 watt fluorescent lamp. The circuit components which were used are given by way of illustration as follows:

Transistors $Q_3$, $Q_4$, $Q_5$ and $Q_6$ -- 2N1073B.
Diodes $D_5$, $D_6$, $D_7$, $D_8$ --------- 4JA10D.
Diodes $D_9$, $D_{10}$, $D_{11}$, $D_{12}$ ------- IN98.
Resistors $R_3$, $R_4$, $R_5$, $R_6$ -------- 100 ohms.

Saturating reactor $X_2$:
   Saturable Cores 33, 34 ----- Toroidal cores Arnold 2T4635D2.
   Main Winding $N_{21}$ -------- 150 turns of .0142 inch in diameter wire.
   Auxiliary Windings $N_{21}$, $N_{22}$, $N_{23}$, $N_{24}$, $N_{25}$ ----------- 15 turns of .0142 inch in diameter wire.
   D.C. Bias Windings $N_{26}$, $N_{27}$ ------------------ 50 turns of .032 inch in diameter wire.

In order to initiate the electric discharge a starting aid voltage was applied from a 60 cycle power supply. Since the fluorescent lamp was of the hot cathode type, a small filament heating transformer was connected in circuit with the lamp filaments to provide a filament heating current. The lamp was satisfactorily operated from a D.C. potential source of 77 volts applied across terminals 35, 36 and with a bias current supply of 0.88 amperes at the bias terminals 37, 38.

The inverter circuit arrangements of the invention provide the advantage that the burden on the semiconductor switching device can be effectively decreased. With the four-transistor bridge arrangement, it is possible for a given load voltage to reduce the operating voltage across the semiconductor switching device by one half as compared with the inverter circuit having two semiconductor switching devices. Further, it will be appreciated that a current limited inversion of a D.C. source is achieved with a circuit configuration that employs only one saturating reactor which controls the switching action, maintains the current at a predetermined level in each half cycle and also sustains the supply of current to the load during a portion of each cycle when the power from the D.C. source is interrupted.

An important advantage achieved by the improved arrangement of the present invention is that saturable reactors having relatively low volt-ampere ratings can be employed for the operation of loads having a negative impedance characteristic. It is possible to reduce the total volt-ampere requirements of the saturating reactors used since the volt-second capacity of the reactor is more efficiently utilized. The switching device effectively interrupts the supply of current from the source when the reactor saturates to allow it to recover and then connects the source with the saturating reactor at the end of its recovery period. Where the improved inverter circuits are used to operate electric discharge lamps such as fluorescent lamps, the saturating reactor can be used to effectively match the inverted D.C. supply to the requirements of the lamp load so that an optimum lamp current waveform can be provided. With improved lamp current waveform, it is possible to obtain rated light output with a lower R.M.S. lamp current.

Although in the illustrated embodiment of the invention I have employed transistors as the semiconductor switching devices, it will be apparent to those skilled in the art that other semiconductor devices such as gate-turn-off controlled rectifiers may be substituted for the transistors with minor modifications to the gating circuits. Further, it will be understood that many other modifications may be made and that the inverter circuits described herein are illustrative examples of specific embodiments of the invention. It is therefore intended by the appended claims to cover all such modifications that fall within the true spirit and scope of the invention.

What I claim as new and desire to secure by Letters Patent of the United States is:

1. An apparatus for operating an electric discharge lamp with an alternating potential comprising: a pair of input leads for connection in circuit with a D.C. supply means, first and second unilateral semiconductor switching devices operable between a high and a low impedance condition, said first semiconductor switching device being connected in circuit with said first input lead, said second semiconductor switching device being connected in circuit with the other of said input leads, said first and second semiconductor switching devices being joined in series circuit relation, a saturating reactor having a first and a second saturable core, a first bias means associated only with said first saturable core, a second bias means associated only with said second saturable core, a first auxiliary winding wound on both of said saturable cores and coupled with said first semiconductor device, a second auxiliary winding wound on both of said cores and coupled with said second semiconductor switching device, said first auxiliary winding causing the first semiconductor switching device to be driven to a high and low impedance condition in response to the condition of saturation of said first saturable core and said second auxiliary winding causing the second semiconductor switching device to be driven to a high and low impedance condition in response to the condition of saturation of said second saturable core, a main winding wound on both of said saturable cores and having one end connected in circuit with said first and second switching devices, circuit means for joining the other end of said main winding in circuit with one end of the electric discharge lamp and for connecting the other end thereof in circuit with the D.C. supply means thereby to cause current to flow from the supply means in one direction when one of said semiconductor switching devices is driven to a low impedance condition and to cause current to flow through said main winding in the opposite direction when said other switching device is driven to the low impedance condition, a first unidirectional conducting device connected across said first semiconductor switching device to provide a path for reverse current flow thereacross, a second unidirectional conducting device connected across said second semiconducting switching device to provide a path for reverse current flow thereacross, said first saturable core being rendered active in response to the flow of current through said main winding in one direction and inactive in response to the flow of current in the reverse direction during a portion of the positive half cycle to hold the current at a substantially constant level and the second saturable core being rendered active in response to the flow of current through said winding in said reverse direction and inactive in response to flow of current in said one direction during a portion of the negative half cycle to maintain the current substantially constant.

2. A current limiting inverter circuit for operating an electric discharge lamp, said circuit comprising: a first unilateral semiconductor device, a second unilateral semiconductor device, said semiconductor devices having at least a pair of terminals and being operable between a low impedance and a high impedance condition, said first semiconductor switching device having one terminal thereof adapted for connection in circuit with the positive side of a first D.C. potential source, said second semiconductor switching device having one terminal thereof adapted for connection to the negative side of a second potential source, said first and second semiconductor devices being joined in series circuit relation, a unidirectional conducting means connected across each of said semiconductor devices to provide a path for reverse current thereacross, a saturating reactor having a main winding wound on a pair of saturable cores for rendering one of the saturable cores active and the other saturable core inactive when the flow of current through the main winding is in one direction and for reversing the active and inactive states of said saturable cores when the current flow through said main winding is in the opposite direction, a first D.C. bias means associated with one of said cores to provide a bias magnetomotive force in opposing relationship to the magnetomotive force of the main winding during the positive half cycle, a second D.C. bias means associated with the other of said saturable cores to provide a bias magnetomotive force in opposing relationship to the magnetizing magnetomotive force of said main winding during the negative half cycle, a first auxiliary winding wound over both of said saturable cores and coupled with said first semiconductor device to drive said device to a high and low impedance condition in response to the condition of saturation of the active one of said cores during the positive half cycle, a second auxiliary winding coupled with said second semiconductor device to drive said second semiconductor device to a high impedance condition in the negative half cycle in response to the condition of saturation of the active one of said cores during the negative half cycle, and circuit means for connecting one end of said main winding in circuit with one end of the electric discharge lamp and for connecting the other end of said electric discharge lamp in circuit with the negative side of the first potential source and the positive side of the second potential source, said main winding being connected at the other end thereof in circuit with said semiconductor devices, said saturating reactor holding the lamp current at a predetermined level during a portion of each half cycle and sustaining the current supply to said lamp during a portion of each half cycle after one of said semi-conductor switching devices is turned off.

3. The current limiting inverter set forth in claim 2 wherein said first D.C. bias means is comprised of a winding wound only on said first saturable core and said second bias means is comprised of a winding wound only on said second saturable core, said bias windings being adapted for connection to a source of D.C. bias current and having a D.C. choke connected in series circuit therewith.

4. In an inverter circuit having terminals for connection to a pair of D.C. potential sources having a connection joining said potential sources in series circuit relation, a first semiconductor device, a second semiconductor device, said semiconductor devices being operable between a low and a high impedance condition, a diode element connected across each of said semiconductor devices to provide a path for reverse current flow thereacross, circuit means for connecting said first and second semiconductor devices across the serially connected potential sources and including a connection joining said semiconductor devices in series circuit relation, a saturating reactor comprised of a first and second saturable core, a first bias means associated with said first saturable core, said first saturable core being rendered active in the positive half cycle when the magnetomotive force of said main winding opposes the magnetomotive force of said first bias means and being rendered inactive in the negative half-cycle when the magnetomotive force of said main winding is in aiding relation to the magnetomotive force of said first bias means, a second bias means associated with said second saturable core, said second saturable core being rendered active during the negative half cycle when the magnetomotive force of said main winding opposes the magnetomotive force of said second bias means and being rendered inactive during the positive half cycle when the magnetomotive force of said main winding is in aiding relation to the magnetomotive force of said second bias means, a first auxiliary winding wound on both said first and second saturable cores and coupled with said first semiconductor device to switch said first semiconductor device to a high impedance condition in response to the saturation of said first core during the positive half cycle, a second auxiliary winding wound over both of said saturable cores and coupled with said second semiconductor device to switch said second semiconductor device to a high impedance condition during the negative half cycle, a main winding wound over both said first and second saturable cores, and circuit means for connecting a load in electrical circuit with the main winding of said saturating reactor and in circuit with the connection joining said potential sources and the connection joining said semiconductor devices, said first semiconductor device being switched to a high impedance condition in the positive half cycle and said second semiconductor device being switched to a high impedance condition in the negative half cycle to allow said saturating reactor to recover, said saturating reactor sustaining the supply of current to the load during a portion of each half cycle when the supply of current from the D.C. potential sources is interrupted.

5. A current limiting inverter comprising: at least a pair of terminals, one of said terminals being adapted for connection to the positive side of a first D.C. potential source and the other of said terminals being adapted for connection to the negative side of a second D.C. potential source, a first and second transistor connected in series circuit relation across said terminals, each of said transistors having an emitter, collector and base electrode, a first diode means connected across said first transistor to provide a path for reverse current flow thereacross, a second diode means connected across said second transistor to provide a path for reverse current flow thereacross, a saturating reactor comprised of a first and second saturable cores, a D.C. bias means associated with said first saturable core, a second D.C. bias means associated with said second saturable core, a first auxiliary winding wound on said saturable cores and coupled with said first transistor to drive said first transistor to a high and low impedance condition in response to the condition of saturation of said first saturable core in the positive half cycle of the alternating output, a second auxiliary winding wound on said saturable cores and coupled with said second transistor to switch said second transistor to a high and low impedance condition in response to the condition of saturation of said second saturable core in the negative half cycle, a main winding wound on said first and said second saturable cores, one end of said main winding being connected in circuit with the collector electrode of one of said transistors and with the emitter electrode of the other of said transistors, and circuit means for connecting the other end of said main winding in circuit with the load and in circuit with the negative side of the first D.C. potential source and with the positive side of the second D.C. potential source, said first saturable core thereby being rendered active in the positive half cycle during which the magnetomotive force of the main winding opposes the magnetomotive force of said first bias means and being rendered inactive when the magnetomotive force of said main winding is in aiding relation to the magnetomotive force of said first bias means, said second saturable core thereby being rendered active in the negative half cycle during which the magnetomotive force of the main winding opposes the magnetomotive force of the second bias means and being rendered inactive when the magnetomotive force of said main winding is in aiding relation to the magnetomotive force of said second bias means, said saturating reactor maintaining said current at a predetermined level during a portion of each half cycle, and said saturating reactor sustaining the flow of current to the load during a portion of each half cycle when the supply of current from the D.C. potential sources is interrupted.

6. A current limiting inverter circuit for operating a load from a first and second D.C. potential source, said inverter circuit comprising: first and second unilateral semiconductor devices, each of said devices being operable between a low and high impedance condition, a diode connected in shunt with each of said semiconductor devices to provide a path for the flow of reverse current thereacross, a saturating reactor having a first saturable core, as second saturable core, and a main winding wound on both said first and second saturable cores, a bias means associated with each of said first and second saturable cores, said first saturable core being rendered active when the flow of current through said main winding is in one direction to provide a magnetomotive force in opposition to the magnetomotive force of the bias means associated with said first saturable core, said second saturable core being rendered active when the flow of current through said main winding is in a reverse direction to provide a magnetomotive force in opposition to the magnetomotive force of the bias means associated with said second saturable core, a first auxiliary winding on said saturable cores and coupled with said first semiconductor device to drive said first device to a high and low impedance condition in response to the condition of saturation of said first saturable core, a second auxiliary winding on said saturable cores and coupled with said second semiconductor device to drive said second device to the high and low impedance condition in response to the condition of saturation of said second saturable core, circuit means for connecting said first source of D.C. potential in a closed loop including said first semiconductor device, the load and said main winding of said saturable reactor to provide a path for the flow of current from said first D.C. potential source to the load in one direction, and circuit means for connecting said second D.C. potential source in a closed loop including said second semiconductor device, the load and said main winding to provide a path for the flow of current from the second D.C. potential source to the load in a reverse direction, said saturating reactor maintaining the current supplied from said first and said second D.C. potential sources to the load at a substantially constant level and sustaining the flow of current to said load during the recovery period of said saturating reactor in each half cycle.

7. The current limiting inverter set forth in claim 6 wherein said first bias means is comprised of a bias winding wound only on said first saturable core and said second bias means is comprised of a bias winding wound only on said second saturable core, said bias winding being adapted for connection to a D.C. choke and source of D.C. bias current.

8. The current limiting inverter set forth in claim 6 wherein said first and second semiconductor switching devices are PNP transistors.

9. An apparatus for operating a load with an alternating current and for connection with a D.C. source, said apparatus comprising four unilateral semiconductor devices connected in a bridge circuit arrangement and having terminals for connection to the D.C. potential source, each of said unilateral semiconductor devices having a unidirectional conducting device connected in shunt therewith to provide a path for the flow of reverse current thereacross, a saturating reactor having a first and a second saturable core, a main winding wound on said first and second saturable cores, a first bias means associated with said first saturable core, said first saturable core being rendered active during a portion of the half cycle of the alternating output when the magnetomotive force of the main winding opposes the magnetomotive force of said first bias means, a second bias means associated with said second saturable core, said second saturable core being rendered active during a portion of the half cycle when the magnetomotive force of said main winding opposes the magnetomotive force of said second bias means, auxiliary windings wound on said first and second saturable cores, each of said semiconductor devices being coupled with one of said auxiliary windings, one pair of said semiconductor devices being driven to a high and low impedance condition in response to the condition of saturation of said first saturable core, the other pair of said semiconductor switching devices being driven to a high and low impedance condition in response to the condition of saturation of said second saturable core, and circuit means for connecting the load and said main winding of said saturating reactor within said bridge arrangement, said saturating reactor maintaining the load current supplied from the D.C. potential source at a predetermined level during a portion of each half cycle and sustaining the flow of current to the load at substantially the same level when the semiconductor devices are in the high impedance condition.

10. The apparatus set forth in claim 9 wherein said first bias means is comprised of a winding wound only on said first saturable core and said second bias means is comprised of a bias winding wound only over said second saturable core, said bias winding being adapted for connection to a source of D.C. bias current and having a D.C. choke connected in series circuit therewith.

11. The apparatus set worth in claim 9 wherein said semiconductor devices are PNP transistors.

References Cited by the Examiner
UNITED STATES PATENTS

| | | | |
|---|---|---|---|
| 2,949,565 | 8/1960 | Rohloff | 315—200.1 |
| 3,059,191 | 10/1962 | Hierholtzer | 331—113.1 |

DAVID J. GALVIN, *Primary Examiner.*